ROBERT A. WOODSON
INVENTOR

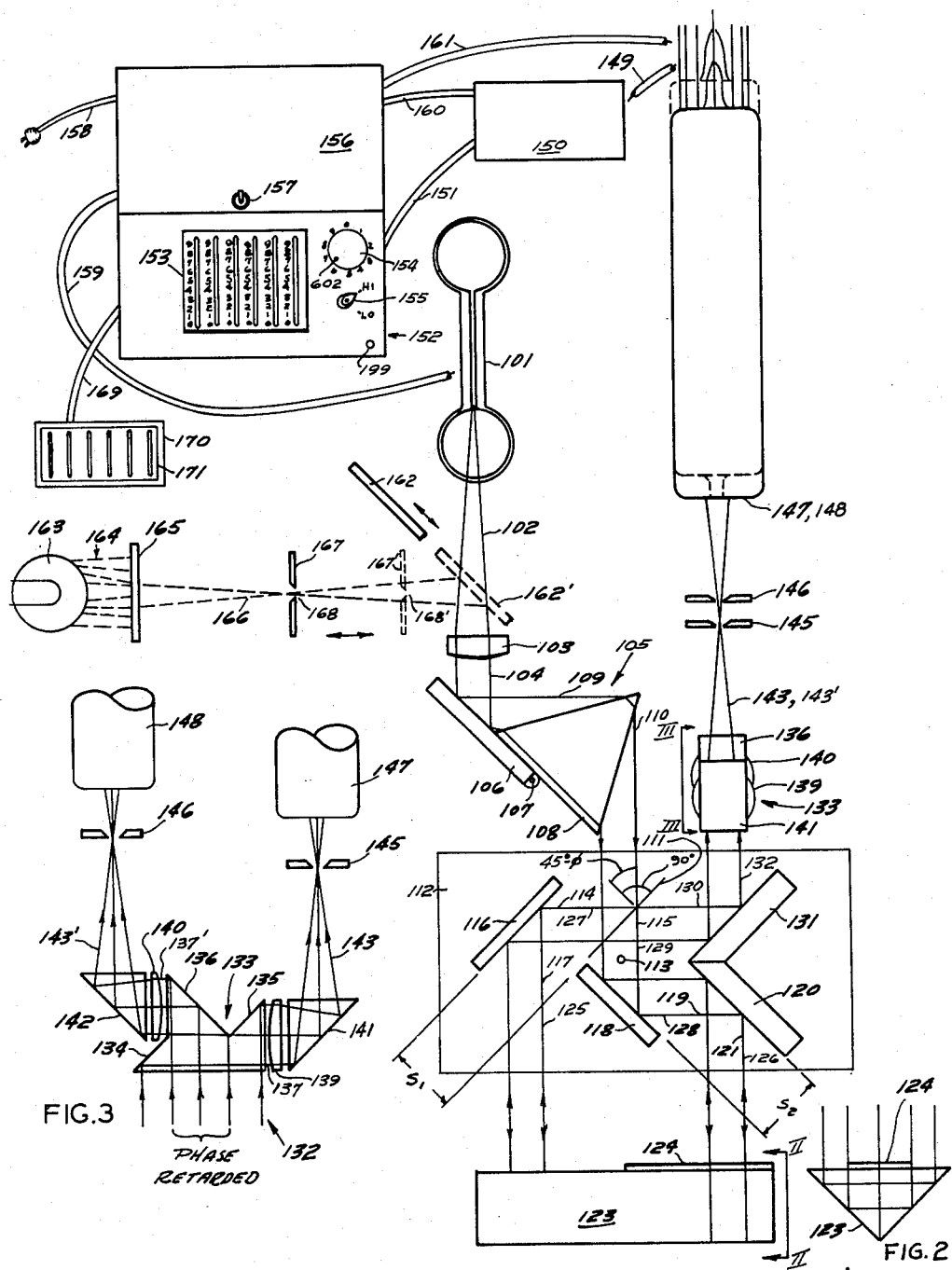

BY Rankin A. Milliken

ATTORNEY

United States Patent Office 3,186,294
Patented June 1, 1965

3,186,294
INTERFEROMETRIC GONIOMETER
Robert A. Woodson, Vestal, N.Y., assignor to General Precision, Inc., Binghamton, N.Y., a corporation of Delaware
Filed Oct. 13, 1960, Ser. No. 62,394
9 Claims. (Cl. 88—14)

The present invention relates to interferometric apparatus, and more particularly to interferometric apparatus of the type in which a series of alternation from light to dark, and dark to light, produced by the displacement of an input optical member are counted by electronic counter means.

An important object of this invention is to provide interferometric apparatus for measuring with great precision the angular displacement of a movable test member with respect to a fixed reference member in such a way that the read-out is completely independent of any translational motion of the test member.

Another object of this invention is to provide means for measuring angles with freedom to select the desired sensitivity of measurement.

Yet another object of this invention is to provide a stable computer for the sine, cosine, and other trigonometric functions of one or more angles.

Other objects of this invention are to provide an improved geodimeter, and a standard for calibrating master angle gauges.

Other objects of the invention will in part be obvious and will in part appear hereinafter.

The invention, accordingly, comprises the features of construction, combinations of elements, and arrangement of parts, which will be exemplified by in the construction hereinafter set forth, and the scope of the invention will be indicated in the claims.

For a fuller understanding of the nature and objects of the invention reference should be had to the following detailed descriptions taken in connection with the accompanying drawings, in which:

FIG. 1 is a schematic diagram of the complete system of an exemplary embodiment of the invention.

FIG. 2 is a view taken from the right hand end of the retro-director of the apparatus of FIG. 1.

FIG. 3 is a partial side view of a portion of the apparatus shown in FIG. 1.

FIGS. 6a through 6i constitute a series of views of the cathode ray tube interpolator of the apparatus of FIG. 1 as seen during successive stages of the process of zeroing the apparatus of the invention employing the white-light zeroing auxiliary apparatus illustrated and described herein in connection with FIG. 1.

Figure 7:
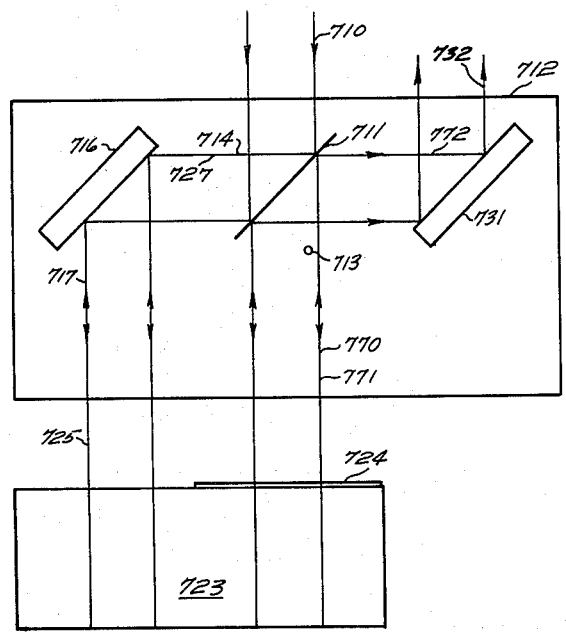

FIG. 7 is a plan view of an alternative embodiment of the rotor and "gonior" of the apparatus of FIG. 1.

Referring first to FIG. 1, a complete, exemplary, embodiment of the instant invention may be seen to comprise the following parts, coacting as described hereinbelow.

Figure 4:
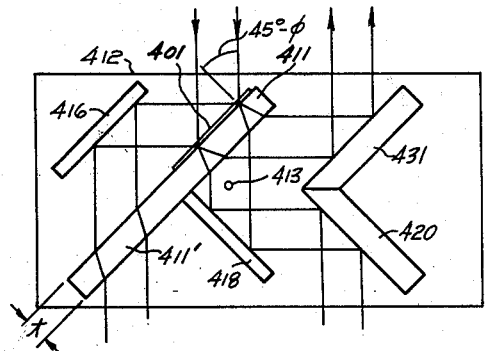
FIG. 4 is a plan view of an alternative embodiment of the rotor and "gonior" of the apparatus of FIG. 1.
Figure 5:
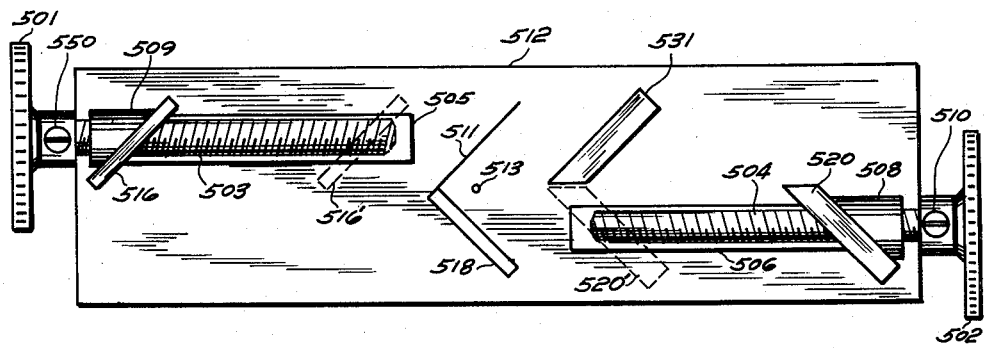
FIG. 5 is a plan view of a second alternative embodiment of the rotor and "gonior" of the apparatus of FIG. 1.

Krypton Geissler lamp 101 is excited by well-known means which need not be described herein to produce a substantially monochromatic beam of light 102. Light beam 102 is collimated by collimating lens 103. After collimation by collimating lens 103 the substantially monochromatic beam of light produced by Geissler lamp 101 is designated 104. A combination of optical elements 105 made up of mirror 106 and dispersing prism 108, the combination being rotatable as a unit about pivot 107, is disposed in the path of beam 104. Beam 104, after reflection from mirror 106, impinges upon dispersing prism 108. Beam 104 after reflection from mirror 106 is designated 109. As is well known to those skilled in the art, dispersing prism 108 will deviate the components of beam 109 impingent thereupon according to the wave length of those components. Numeral 110 designates only that component of beam 109 of a selected wavelength. It may be seen from the above that collimating lens 103, mirror 106, and dispersing prism 108 act in conjunction to monochromatize the light coming from lamp 101. In constructing a practical embodiment of the apparatus in FIG. 1 is Geissler lamp 101, the collimating lens 103, the optical means 105, will all be mounted upon a stationary portion of the apparatus which will hereinafter be designated the "stator." Numeral 112 designates a rotatable platform element which is rotatably mounted upon the stator. This rotatable platform apparatus will hereinafter be called the "rotor." In employing the apparatus of FIG. 1, for instance, for measuring the angle of a standard paper gauge a reference, knife-edge member will be mounted upon the stator so as to be translatable but not rotatable. A second knife-edge, test member will be mounted upon the shaft upon which the rotor pivots. Thus, it may be seen, how the rotation of the rotor member with respect to the stator member may be related directly to a desired angular quantity to be determined. It will be assumed in the discussion hereinafter that the angular position of the rotor with respect to the stator can be "coupled out," or related to desired angles to be measured in many ways which will occur to those skilled in the art. Proceeding, then, with the description of the apparatus of FIG. 1, it may be noted that there are a plurality of optical elements 116, 118, 111, 120, and 131 fixedly mounted upon the rotor. These optical elements, and similar groups of optical elements as shown in FIGS. 4, 5, and 7, will hereinafter be styled the "gonior." Light beam 110 upon emerging from dispersing prism 108 impinges upon beam splitter 111. Beam splitter 111 is of the pellicle, or thin membrane variety.

The beam splitter 111 may, however, be a partial reflector having substantially a constant reflectance and a constant transmittance over all portions of its useful aperture. Alternately it may comprise some areas which are substantially full reflector regions and other areas which are substantially full transmitter regions. Such areas may be formed variously as stripes, checkered, etc. Preferably the full reflector regions will have the same area as the full transmitter regions.

The advantage of a striped beam splitter is that it may be fabricated using techniques for forming second surface mirrors (such as by chemical silvering methods) where the more complex techniques of forming partial reflection coatings may not be propitious.

This invention embraces other forms of plane beam splitters as well, and is not to be restricted to the usual forms such as those already discussed. An example of another form of beam splitter is a polarizing means which may transmit one plane polarized component and reflect the orthogonal plane polarized component. Circular or elliptical polarization may also be used. Such polarization components and their polarization retardation plate accessories are well known in the optical art and need not be described here. Another example of a different form of beam splitter is an element which intermittently reflects and transmits the incident radiation. If the frequency of the intermittence is adequately high, it may be used in the present invention as a beam splitter.

Beam splitter 111 is adapted to reflect a portion of impingent beam 110 and pass a portion of impingent beam 110 therethrough. The reflected portion of impingent beam 110 is designated 114. The transmitted portion of impingent beam 110 is designated 115. It will be noted that one of the lines denoting light beam 114 is also enumerated 127. Similar dual numerical beam designations will be found in other places in FIG. 1. Where such dual designations are found, they are to be interpreted as referring to light beams traveling in opposite directions along the same path as viewed in FIG. 1 (and in FIG. 7). For instance, 114 and 127 refer respectively to light traveling to the left in the diagram of FIG. 1 and to light traveling to the right in the diagram of FIG. 1. It may be seen that light beam 114 upon being reflected from mirror 116 continues downwardly and is designated 117. Light beam 117 continues its travel until it impinges upon retrodirective member 123 after which it returns along the same line but in the opposite direction, and is then styled 125. Further tracing the travel of beam 125, it is then reflected from mirror 116 and is thereafter designated 127. Now considering beam 115, this beam is reflected from mirror 118 and, designated 119, it travels to and is reflected from mirror 120, whereafter it is designated 121. Beam 121 is retrodirected by element 123 in the same manner in which beam 117 is retrodirected by element 123. Thereafter beam 121 is styled 126. It may be noted, however, that the end of retrodirector 123 which retrodirects beam 121 carries an additional element 124 which is not found at the end of retrodirector 123 which retrodirects beam 117. This element 124 is a phase retardation coating, well-known to those skilled in the art, which extends, as is shown by comparison of FIGS. 1 and 2, over the inner half of the upper surface of 123 and approximately to the center of the longitudinal dimension of 123. This phase retardation coating introduces a one-eighth wave length retardation in phase of that portion of impingent beam 121 which passes therethrough. However, as may easily be seen, that portion of impingent beam 121 which passes through phase retardation coating 124 on its passage into retrodirector 123, also passes through phase retardation coating 124 in its passage out of retrodirector 123. Thus, it may be seen, that that portion of beam 126 which has passed twice through retardation coating 124 has suffered a total retardation of one-quarter wavelength with respect to that portion of beam 126 which has not passed through retardation coating 124. Although not shown directly in the drawing, only that portion of beam 126 which has not passed through retardation coating 124 will hereinafter be designated as 126, the portion of beam 126 which has passed through retardation coating 124 will hereinafter be designated 126'. Similarly, beams 128, 129, etc., will have prime, or one-quarter wave length phase retarded components, though these components are not shown directly in the drawings. Beam 126 (and its phase-retarded component 126') now travels upward and is reflected from mirror 120 whereafter it is designated 128. It should be noted that the action of the optical members of the gonior results in rendering beams 117, 125, 121, 126, and 126' all parallel to beam 110, regardless of the orientation of the rotor and gonior with respect to the stator. Beam 128, upon being reflected from mirror 118, is designated 129. Beam 129 will be partially reflected from the back side of beam splitter 111, and will then be designated 130. It will be recognized, however, that beam 130 is made up not only of the components of beam 129 reflected from beam splitter 111, but also beam 127, or so much of beam 127 as passes through beam splitter 111. Beam 130, then, is composed of three components. These components are: (1) that portion of beam 127 which passes through beam splitter 111, (2) that component of beam 129 which is not phase-retarded by a one-quarter wave length, i.e., the non-primed portion of beam 129, (3) that portion of beam 129 which is retarded by one-quarter wave length, i.e., 129'. Beam 130, including all three of its components, is then reflected from mirror 131, after which it is designated 132. It will be evident to those skilled in the optical art that beams 130 and 131, by virtue of the recombination of beams 127 and 129 which have a common source, will be characterized by standing waves, commonly designated fringes. Beams 130 and 132 will also be characterized by additional fringes displaced by one-quarter wave length. Beam 132, after leaving the gonior and rotor, is directed onto the beam splitting and deviating means generally designated as 133. As may be seen from a study of FIGURE 3, beam splitting and deviating means 133 is so arranged that the primed, or phase-retarded, portion of beam 132 impinges upon the central reflected portion 136 thereof. The phase-retarded, or primed, portion of beam 132 is, after reflection from 136, directed leftwardly through stigmating lens 140, and is thereafter directed upwardly by prism 142. Similarly, the non-phase-retarded, or unprimed, portion of beam 132 impinges upon reflectors 134 and 135. After reflection from 134 and 135 the unprimed portions of beam 132 are directed rightwardly through stigmating lens 139 into prism 141, by which they are directed upwardly. Beam 143, after leaving prism 141 passes through a pinhole in diaphragm 145 and onto the photosensitive cathode of photomultiplier tube 147. Similarly, beam 143', after leaving prism 142, is directed through a pinhole in diaphragm 146 onto the photosensitive cathode of photomultiplier 148. It will be clear to those skilled in the optical art that diaphragms 145 and 146 acting conjointly with dispersing prism 108, mirror 106, and collimating lens 103 serve to monochromatize the light beam 102 produced by lamp 101 to a greater degree than is characteristic of the untreated beam. The coaction of photomultipliers 147 and 148, and their associated circuitry, with light beams 143 and 143' need not be described in detail herein, since the fringe counting systems of which photomultipliers 147 and 148 form a part is well known in the prior art, and more particularly, is disclosed in detail in United States Patent 2,604,004. Briefly described, the fringe counting system comprises the two photocells 147 and 148, cable 149 for transmitting the signals from the two photocells individually to preamplifier 150, cable 151 for transmitting the signals from the two individual photocells to counter 152. Counter 152 is of the "reversible" type in the sense that it actuates readout digital display 153 to show the totality of all pulses from photo multiplier 147 which have occurred one-quarter wavelength "before" pulses from photomultiplier 148, less all pulses from photomultiplier 147 which have not occurred one-quarter wavelength "before" pulses from photomultiplier 148. A reversible counter of the type well adapted for application in the apparatus of FIG. 1 is shown and described in United States Patent 2,833,476. Analog interpolation between the pulses, or fringes indicated upon digital readout display 153 may be had on cathode ray tube 154. The use and construction of such an analog interpolation system is described and shown in United States Patent 2,604,004. It is characteristic of the analog interpolator cathode ray tube of the system of FIG. 1, and of the system of United States Patent 2,604,004, that a dot of light appears upon the face of the cathode ray tube. This dot revolves adjacent the outer edge of the cathode ray tube, making one complete revolution from approximately the zero mark shown next to the upper portion of the cathode ray tube face, back to said zero point, during the period between two maximum signals from photomultiplier tube 147. Counter 152 is also provided with control 155 which operates a bandpass filter included in the counter circuit. When control 155 is on its "lo" position only a very narrow band of frequencies is passed through the display system, and "noise" is substantially rejected from the display. By actuation of control 155 into its "hi" position, however, the pass-band of the filter may be considerably widened for reasons which will become evident in connection with the description of the white-light zeroing attachment described hereinbelow. Power supply 156, actuated by on-off switch 157, and supplied with conventional line current through cable 158, provides supply voltages for photomultiplier tubes 147 and 148 through cable 161, and also provides supply voltages for preamplifier 150, and Geissler tube 101, through lines 160 and 159, respectively.

The white-light zeroing means will now be described. White-light zeroing means is put into operation by displacing mirror 162 into position 162', which blocks off all light from Geissler lamp 101, and reflects light beam 166 downwardly through collimating lens 103. White light source 163 provides a wide-area bundle of light composed of extremely broad wave-length spectrum 164 which impinges upon ground glass 165. White-light source may, for instance, be a tungsten incandescent lamp. Disposed between ground glass screen 165 and mirror 162 in its 162' position is diaphragm 167 containing pinhole 168. Diaphragm 167 is made adjustable by simple mechanical means (not shown) in such manner that pinhole 168 travels along the path formed by the center of collimator 103 as reflected in mirror 162 when in a 162' position. Along this path, diaphragm 167 is positionable selectively at the focal point of collimator 103, as reflected in mirror 162, or remote therefrom. That is to say, at 167 or 167', or at any desired place therebetween. The operation of the white-light zeroing system, along with the operation of the entire system of FIG. 1, will be described hereinafter.

*Operation of FIG. 1*

Figure 6:
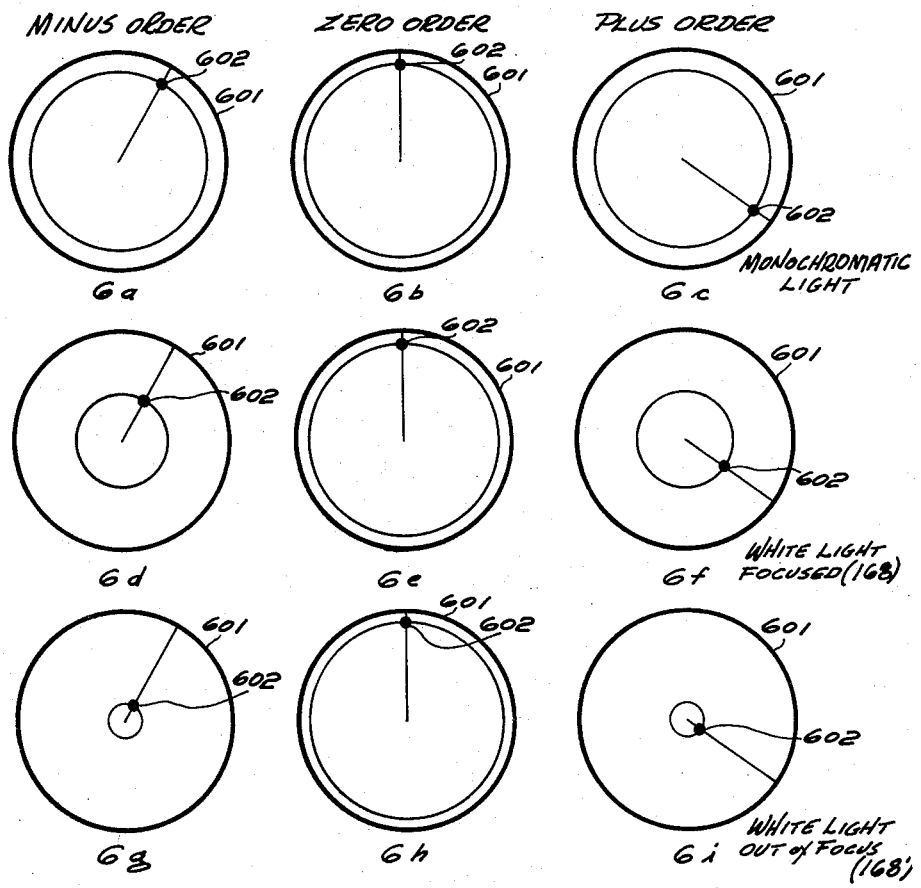

The apparatus of FIG. 1 operates as follows. The apparatus is initially put into operation by actuating switch 157 of power supply 156 into the "on" position. By so doing the Geissler lamp is caused to emit its beam of light 102, the operating power is supplied to preamplifier 150 and photomultiplier tubes 147 and 148. Before commencing measuring operation a "zeroing" operation may occasionally have to be carried out, though a practical apparatus can be built according to the invention which requires "zeroing" but infrequently. The zeroing operation is initiated by moving mirror 162 to its 162' position. In addition, control 155 on counter 152 must be operated to its "hi" position. With mirror 162 in its 162' position, the light from white-light source 163, as it passes through ground glass screen 165, and pinhole 168, is directed downwardly from pinhole 168 through collimator 103. Pinhole 168 may be regarded as a point source of polychromatic light positionable, as desired, at or remote from the focus of collimator 103 as reflected by mirror 162. It will be evident to those skilled in the art that when pinhole 168 is at the reflected focus of collimator 103, then collimator 103 (and its associated elements, mirror 106, dispersing prism 108, stigmating lenses 139 and 140, and pinhole diaphragms 145 and 146) will serve to pass only light of a selected wavelength to the cathode of photomultipliers 147 and 148; whereas, when pinhole 168 is not at the reflected focus of collimator 103 light components having a broad band of wave length will reach the cathode of photomultipliers 147 and 148. Inspection of the relationship of the elements of the gonior as disposed upon the rotor will show that when $S_1=S_2$, as is the case, the order of interference of beam 132 will be zero, or very close to zero, only when the rotor is so positioned that the angle $\phi$ is zero, or very near thereto. The angle $\phi$ is evidently equal to zero when beam 110 makes an angle of exactly 45° with the normal to beam splitter 111. It may thus be seen that rotor 112 can be positioned at its zero degree reference with great precision if we can determine when the interference fringes displayed in beam 132 are of zero order. As is well known, split and recombined beams of white light can show but few orders of interference due to the high degree of cancellation of the various wave length components thereof at only a few orders from the zero order in both the positive and negative direction. By placing pinhole 168 in the 168' position, white light, that is light containing a large number of wave length components, can be passed through the system to the cathodes of photomultipliers 147 and 148. Due to the cancellation effect spoken of above no signals will be produced by photomultipliers 147 or 148 unless the rotor 112 is so oriented that the fringes along beam 132 are of very close to zero order. Also, due to the rapid "damping" of the amplitude of fringes of white light of other than zero order passing away from zero order, it will be evident that the zero order fringe (i.e., that fringe which falls upon the cathode of photomultipliers 147 and 148 when rotor 112 is in its zero position to a very precise degree) will produce a maximum output signal from the photomultipliers. As shown in FIGS. 6g through 6i, the signal from the photomultipliers, as displayed upon cathode ray tube 154, will produce an extremely sensitive index of the zero position of rotor 112. That is to say, when the maximum signal accompanying zero order interference is produced, i.e., when rotor 112 is precisely in its zero position, spot 602 on cathode ray tube face 601 will be at its maximum distance from the center of the tube face. However, when rotor 112 is turned but slightly from its zero position spot 602, as shown in FIG. 6g and FIG. 6i, will drop down very close the center of the cathode ray tube face. While the zero rotation indication produced on cathode ray tube 154 is very precise as shown in FIGS. 6g through 6i, it may be far too sensitive. That is to say, it may be extremely difficult to locate the precise zero position due to the fact that the excursion of point 602 outward at the time when rotor 112 passes through the zero position may be so rapid as to be imperceptible, or at least practically imperceptible. In order to allow for that case, pinhole 168 may be placed at the reflected focus of collimator 103. When this is done, the "drop" of point 602 toward the center of the cathode ray tube face as rotor 112 passes off its zero position will be considerably less rapid than is the case when pinhole 168 is remote from the reflected focus. The appearance of the cathode ray tube display at that time, or under those operating conditions, is shown in FIGS. 6d through 6f. Thus, it may be seen, that the mechanical means for adjusting the position of diaphragm 167, and pinhole 168, constitutes a "sensitivity" adjustment means whereby the white-light zeroing process may be readily performed. Provision may, of course, be made whereby the reference member may be unlocked from the rotor shaft during the "zeroing" operation. Having carried out the "zeroing" operation, mirror 162 is now withdrawn from its 162' position to its inactive, or 162, position. Thus, no light from pinhole 168 can pass to collimator 103, but beam 102 from Geissler lamp 101 now impinges upon collimator 103. The highly monochromatic light of beam 102 will, of course, not display the very few fringes characteristic of white light but, on the other hand, will be capable of manifesting the fringes corresponding to many orders of interference on either side of zero order. It may be noted at this point that, after the zeroing process, i.e., when the diaphragm 167 was at its 167' position, and when the dot 602 was at the position shown in FIG. 6h, the counter display 153 was reset to zero by depressing momentarily the zero reset button 199 on counter 152, and the control 155 on counter 152 was returned to its "lo" position. It will be evident to those skilled in the art upon inspection of the arrangement of the gonior elements that the two split beams 114 and 115 have a path difference introduced which is precisely proportional to the sine of the angle $\phi$, where $(45°-\phi)$ is the angle of incidence on the beam splitter. This being the case, it is evident that, whatever angle the rotor is turned through within practical limits, the count displayed upon digital readout of display 153 will be exactly equal to a known constant times the sine of the angle through which the rotor is turned. Also, due to the "reversible" nature of counter 152, digital readout display 153 will continue to show the precise sine of the angle from zero of the rotor 112, even though the rotor is displaced many times first clockwise and then counterclockwise. Thus, it may be seen, that the taper of a master gauge, for example, may be determined to a high degree of precision by inserting the master gauge between a test member locked to the rotor shaft and a reference member secured to the stator. As noted above, the reading of readout 153 or any angular displacement of rotor 112 from its zero position will not be the displacement angle, but its sine times a known constant. This being the case, it is necessary to convert these readings by means of a multi-place table of natural sines. Alternatively, a digital conversion device 170 may be provided which will convert the sine signals from counter 152 to such form as to actuate digital readout device 171 to read in terms of degrees, minutes, seconds, and fractions of seconds angular deviation of rotor 112 from its zero position. Since converter 170 is not essential to this invention, it need not be described here. Experience has taught that the optical elements of the system according to the invention need be optically flat, perpendicular, parallel, equally spaced, etc., as indicated in the drawings, only to reasonable manufacturing tolerances in order that the device be able to measure angle to a high degree of precision.

FIG. 4 shows an alternative form of rotor and gonior, 412, which may be substituted for rotor 112 in the system of FIG. 1. Inspection of FIG. 4 will show that a beam splitter comprising a piece of optically flat glass of thickness $t$ has been substituted for the pellicle beam splitter 111 of FIG. 1. The beam splitting coating 401 is applied on the side of optically flat glass plate 411 nearest dispersing prism 108. In order to compensate for the thickness of glass plate 411 mirror 416 corresponding to mirror 116 of FIG. 1, is moved from the position of mirror 116 by an amount $t$ equal to the thickness of plate 411. In addition, plate 411 is extended (411′) to act as a "compensating plate" as in the standard Michelson interferometer. By this means, the beam reflected from coating 401 is caused to suffer as many passages through plate 411 as is the beam which passes through coating 401.

In FIG. 5 there is shown an alternative rotor and gonior which may be substituted for the rotor and gonior of FIG. 1. The rotor and gonior of FIG. 5 have the advantage that the sensitivity of the measuring system may be adjusted by adjusting the spacing of mirrors 516 and 520 from beam splitter 511 and mirror 518, respectively, thus varying $S_1$ and $S_2$ as shown in FIG. 1. It will be appreciated, however, that the spacing between mirror 516 and beam splitter 511, on the one hand, and the distance between mirror 520 and mirror 518, on the other hand, must be kept equal, that is to say, $S_1$ must be kept equal to $S_2$. This is easily accomplished, however, by noting the reading on readout 153, displacing, say, mirror 520 by means of knob 502 and screw 504, locking mirror 520 in place by means of clamp 510, and then displacing mirror 516 by means of knob 501 and screw 503 until the reading on digital readout display 153 returns to the noted value.

An additional form of rotor and gonior of FIG. 1 is shown in FIG. 7. It will be noted that the gonior of FIG. 7 includes mirror 716, corresponding to mirror 116 of FIG. 1, beam splitter 711, corresponding to beam splitter 111 of FIG. 1, and mirror 731, corresponding to mirror 131 of FIG. 1, but that the equivalent of mirror 118 and mirror 120 of FIG. 1 have been eliminated. This change necessitates the shortening of retrodirector 723 of FIG. 7 as compared with retrodirector 123 of FIG. 1. This alternative embodiment of the rotor and gonior also operates according to the sine law, that is to say, when the rotor and gonior of FIG. 7 are substituted for the rotor and gonior of FIG. 1 it will still obtain that the reading on digital readout 153 will correspond to the sine of the angle of deflection of the rotor times a known constant.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is particularly noted that although the invention has been described herein as including the bi-directional counting feature imparted by the use of the two photomultipliers, the reversible counter, and the phase retardation coating, etc., a much more economical uni-directional counting system including a simpler counter, and eliminating one multiplier photocell, and the retardation coating, etc., may be employed within the scope of this invention.

The white-light zeroing apparatus may also be eliminated, and a mechanical zero setting means substituted therefor when economic or design considerations dictate such a step, within the scope of the present invention. It will also be evident that the white light zeroing apparatus disclosed herein may be employed to advantage in the better known linear type of fringe counting interferometric measuring apparatus, such as the Link Fringe-count Micrometer (trademark).

While rotor 112 is stated herein to be rotatable about a pivot, such as 113, it should be clearly understood that, within the scope of this invention, rotor 112 may be rotatable about a pivot which is itself displaceable, or may, in some instances, even be a free body which merely rests upon, or is otherwise correlated with, a portion of the stator.

In some instances it may be desirable to eliminate mirror 131 and mount elements 133, 145, and 146, and the photomultipliers 147 and 148 upon an extension of the rotor. In this case the photomultipliers and their associated circuitry will, of course, be connected to preamplifier 150 by means of a flexible lead, or by means of suitable slip rings or the like apparatus.

Comparison of FIG. 1 and FIG. 7 will show that, within the scope of the invention, a plurality of different gonior arrangements may be made.

It is, of course, within the scope of the invention to employ a truly monochromatic light source at 101, and thereby to dispense with the need for auxiliary monochromating apparatus.

It will also be seen that the monochromating apparatus may be located at any position in the system between the light source and the photocell.

Furthermore, while I have described herein the detailed use of the invention as an angle measuring apparatus, it will be evident that the useful property of the device of converting shaft rotations to digital signals corresponding to a high degree of precision to the sine of the angle of rotation may be taken advantage of in many useful and practical applications.

It is also to be understood that the following claims are intended to cover all of the generic and specific features of the invention herein described, and all statements of the scope of the invention, which, as a matter of language, might be said to follow therebetween.

Having described my invention, what I claim as new and desire to secure by Letters Patent is:

1. Interferometric apparatus comprising,
   (a) first means for producing an incident beam of radiation;
   (b) single retrodirecting means positioned normal to said incident beam of radiation;
   (c) a rotor positioned intermediate said first means and said retrodirecting means;
   (d) optical means cooperating with said retrodirecting means fixedly mounted upon said rotor, and rotatable therewith, for splitting said incident beam into a plurality of emergent beams whose relative phase is a function of their wavelength and of the orientation of said rotor with respect to said incident beam, said optical means further operable to recombine the light beams redirected by said retrodirecting means; and (e) means for detecting the relative phase of selected ones of said emergent beams, whereby said orientation of said rotor with respect to the direction of said incident beam is determined.

2. Interferometric apparatus comprising, (a) first means for producing an incident beam of radiation;

(b) single retrodirecting means positioned normal to said incident beam of radiation;

(c) a rotor positioned intermediate said first means and said retrodirecting means;

(d) optical means cooperating with said retrodirecting means fixedly mounted upon said rotor, and rotatable therewith, for splitting said incident beam into a plurality of emergent beams whose relative phase is a function of their wavelength and of the orientation of the angular displacement of said rotor with respect to the direction of said incident beam and independent within predetermined limits of the translation of said rotor with respect to the direction of said incident beam, and for recombining said emergent beams as redirected by said retrodirecting means into a single beam including first and second portions; and (e) means for detecting the relative phase difference between said recombined emergent beams, whereby said orientation of said rotor with respect to the direction of said incident beam is determined.

3. Interferometric apparatus comprising, (a) first means for producing an incident beam of radiation;

(b) single retrodirecting means positioned normal to said incident beam of radiation;

(c) a rotor positioned intermediate said first means and said retrodirecting means;

(d) optical means cooperating with said retrodirecting means fixedly mounted upon said rotor, and rotatable therewith, for splitting said incident beam into a plurality of emergent beams which are parallel to said incident beam and whose relative phase is a function of their wavelength and of the orientation of said rotor with respect to the direction of said incident beam; and (e) means for detecting the relative phase of selected ones of said emergent beams, whereby said orientation of said rotor with respect to the direction of said incident beam is determined.

4. Interferometric apparatus comprising, (a) first means for producing an incident beam of radiation;

(b) single retrodirecting means positioned normal to said incident beam of radiation;

(c) a rotor positioned intermediate said first means and said retrodirecting means;

(d) optical means cooperating with said retrodirecting means fixedly mounted upon said rotor, and rotatable therewith, for splitting said incident beam into a plurality of emergent beams whose relative phase is a function of their wavelength and of the angle between said rotor and said incident beam, and beam splitter means for combining said retrodirected emergent beams; and (e) means for detecting the relative phase difference between predetermined portions of said combined beams and producing a digital output signal proportional to said function of said angle.

5. An interferometric apparatus comprising, (a) a source of monochromatic light;

(b) collimating means responsive to said source for providing a first light beam;

(c) a rotatable gonior including first optical means responsive to said first light beam for providing second and third parallel light beams;

(d) second optical means positioned normal to the direction of said first light beam and responsive to said second and third light beams for retrodirecting said second and third light beams as fourth and fifth light beams towards said first optical means, said fourth and fifth light beams being parallel to but laterally displaced from said second and third light beams, respectively, and said second optical means including means for retarding the phase of one of said second and fourth and said third and fifth light beams;

(e) said first optical means being further effective to combine said fourth and fifth light beams into a sixth light beam; and (f) counter means responsive to said sixth light beam for indicating rotary displacement of said gonior with respect to said first light beam, said counter means being independent within predetermined limits of any translation of said gonior.

6. The apparatus of claim 5 including, (a) a source of polychromatic light;

(b) means for substituting said polychromatic light source for said monochromatic light source; and (c) said counter means further including means for indicating the position of said gonior at which said second and third light beams provided by said first optical means are parallel to said first light beam when said source of polychromatic light is substituted for said source of monochromatic light.

7. The apparatus of claim 6 including adjustable means for selectively directing light from said source of polychromatic light at or remote from the focus of said collimating means.

8. A fringecounting interferometric measuring apparatus having a rigid member and a movable member and normally employing a light beam of a single wavelength and including an initial adjustment, said apparatus comprising, (a) means for selectively substituting a light beam composed of a plurality of wavelengths for said light beam of a single wavelength;

(b) means for indicating the relative magnitude of the fringes of a conventional interferometric recombined beam derived from said light beam composed of said plurality of wavelengths as the movable member of said interferometric apparatus is displaced;

(c) counter means operable to accumulate the sum of fringes developed as said movable member is displaced; and (d) means for reducing the sum in said counter means to zero when the relative magnitude of the fringes of said recombined beam is a maximum to provide said initial adjustment.

9. The apparatus of claim 8 including means for altering the sensitivity of said indicating means.

References Cited by the Examiner

UNITED STATES PATENTS

| | | | |
|---|---|---|---|
| 1,709,809 | 4/29 | Rashevsky | 88—14 X |
| 2,286,621 | 6/42 | Hurley | 88—14 |
| 2,571,937 | 10/51 | Peck | 88—14 |
| 2,604,004 | 7/52 | Root | 88—14 |
| 2,977,841 | 4/61 | Kaufmann et al. | 88—14 |

FOREIGN PATENTS 367,859 2/32 Great Britain.

JEWELL H. PEDERSEN, *Primary Examiner.*

EMIL G. ANDERSON, *Examiner.*